United States Patent

[11] 3,592,090

[72] Inventor Raymond G. Koopman
 Floyds Knobs, Ind.
[21] Appl. No. 836,325
[22] Filed June 25, 1969
[45] Patented July 13, 1971
[73] Assignee M.K.M. Machine Tool Co., Inc.
 Jeffersonville, Ind.

[54] ROTARY ASSEMBLY OF THE HOLLOW SPINDLE TYPE
 8 Claims, 14 Drawing Figs.
[52] U.S. Cl. .................................................. 82/30,
 82/18, 90/15
[51] Int. Cl. .................................................. B23b 19/02
[50] Field of Search .................................................. 82/11, 18,
 30; 90/15.2; 29/27, 57, 44

[56] References Cited
 UNITED STATES PATENTS
3,456,533 7/1969 Firth et al. .................... 82/2
 FOREIGN PATENTS
1,095,797 12/1954 France ........................ 90/15.2
1,474,770 2/1967 France ........................ 82/18

Primary Examiner—Leonidas Vlachos
Attorney—Arthur F. Robert

ABSTRACT: A rotary spindle assembly is composed of a pair of hollow cylindrical outer and inner parts, each having a pair of equally spaced long parallel axes, one a center axis and the other an offset bore axis. The inner part additionally has a chuck for centering a stock-rod on the center of its offset bore, which is large enough to embrace all four axes. The bore and chuck axes of the inner part, and the center axis of a chuck-held stock-rod, all coincide.

The outer cylindrical part is mounted in an automatic screw machine with its center axis coincident to the main rotary axis of the machine and with its bore axis offset therefrom. The inner cylindrical part is mounted within the offset bore of the outer part with its center axis coincident to the bore axis and with its chuck axis movable along a circular "adjustment" arc, which intersects the center axis of the outer part. By angularly turning the inner cylindrical part, a chuck-held stock-rod may be swung along said circular adjustment arc either to bring the center axis of the rod into coincidence with the center axis of the outer part or to bring any offset rod axis along that adjustment arc into such coincidence.

PATENTED JUL 13 1971 3,592,090

INVENTOR.
RAYMOND G. KOOPMAN
BY *Arthur H. Robert*
ATTORNEY

INVENTOR.
RAYMOND G. KOOPMAN

BY
Arthur H Robert
ATTORNEY

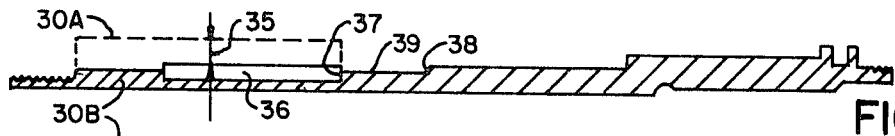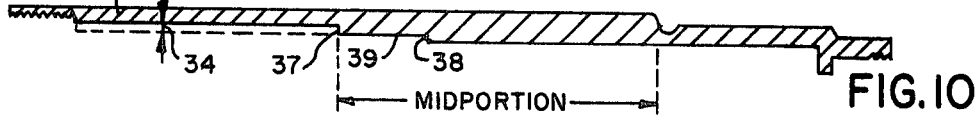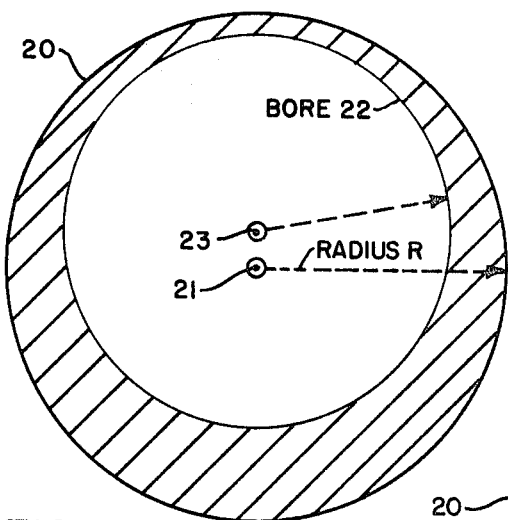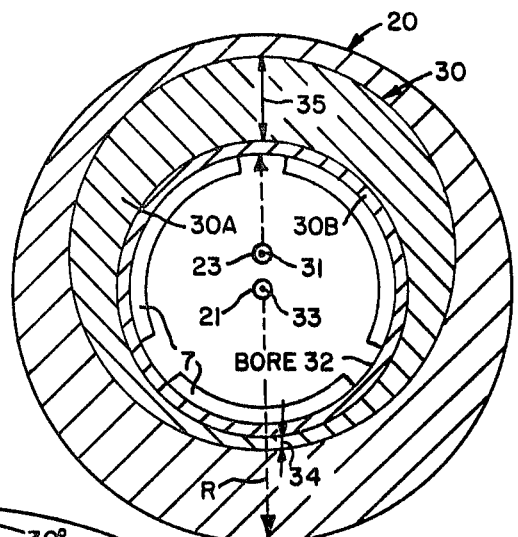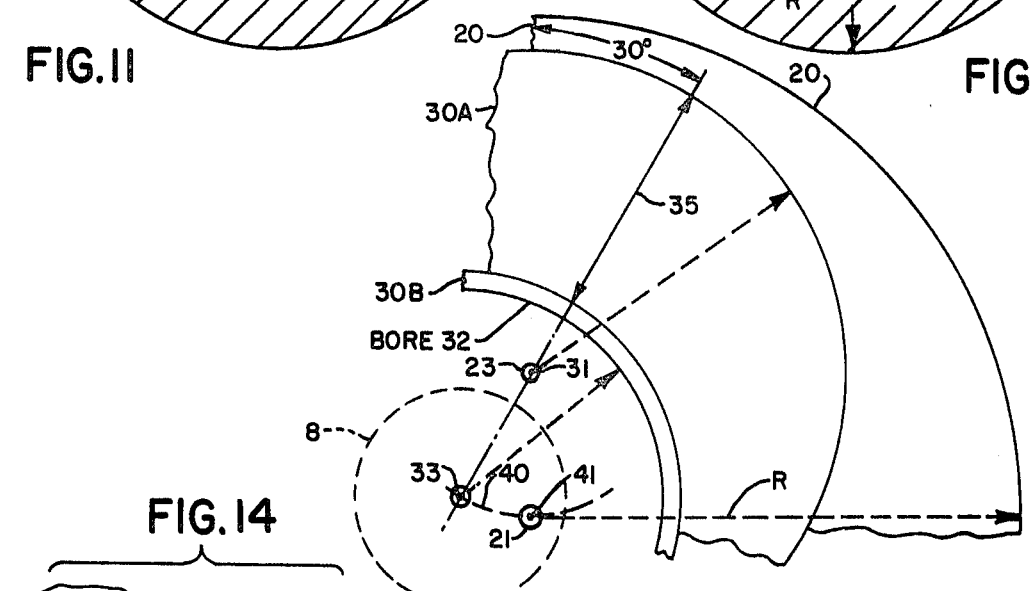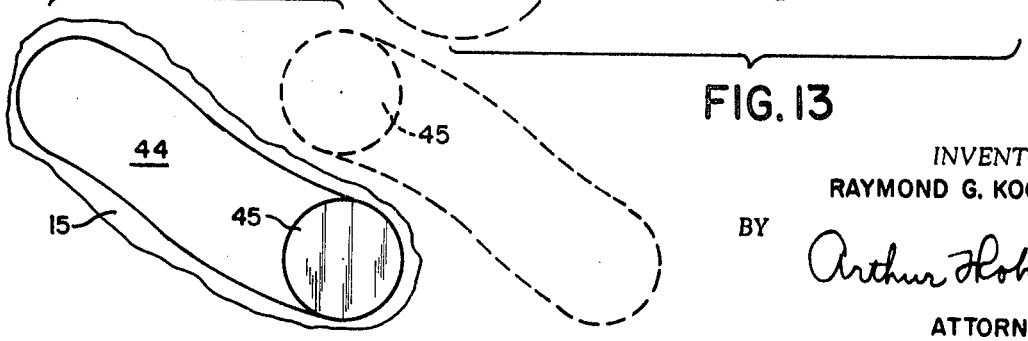

ROTARY ASSEMBLY OF THE HOLLOW SPINDLE TYPE

BACKGROUND OF THE INVENTION

1. Field of the Invention

This invention relates to an improved elongate hollow spindle assembly for use in hollow spindle machines of the type wherein a chuck on the assembly rotates a rod of elongate stock passing through the assembly while holding that rod concentrically centered upon the rotary axis of the machine so that one or more machining operations may be simultaneously or successively performed on an end portion of the rod, embracing the end face thereof and the adjacent portion of its periphery.

2. Description of the Prior Art

Automatic screw machines (and like machines) conventionally comprise: (1) a hollow elongate spindle through which a rod of elongate metal stock is advanced until its advancing end projects from the forward end of the spindle sufficiently to engage means for stopping the projecting end of the rod at a desired position; (2) chuck means on the spindle to grip and center the forward end of the rod on the fixed rotary axis of the machine and then hold it while (a) it is rotated, (b) its forward end face subjected to one or more drilling, reaming, deburring and like operations and (c) its adjacent peripheral face contemporaneously subjected to one or more turning, facing, threading, severing and other like operations; (3) transfer means for engaging the resulting product during the severing operation and for removing it when severed from the rod; (4) means, operative upon severance, to advance the stock-rod forwardly against the stop; and 5) means for controlling the time phase relationship of these various operations.

In the conventional machine, the chuck means on the spindle normally centers the rod concentrically on the fixed rotary axis of the machine and holds it there. This allows the end face of a rotating rod to be drilled only at its longitudinal center axis. In some cases it is necessary to drill the end face of the rod at one or more points offset from its center axis. To perform this operation on the same machine, the stock-rod must be moved transversely to place the offset drilling point in the long center axis of the outer part.

So far as I know, it has heretofore been proposed first to perform those operations which are axially centered on and concentrically centered about the stock-rod, second to operate the chuck to disengage the rod, third to move the rod transversely so as to center its desired offset axis upon the long center axis of the outer part, and fourth to reengage the offset rod in the chuck. Unfortunately, the disengagement of the rod from the chuck makes it impossible consistently to reproduce the identical space relationship desired between each drilled hole and the center axis of the rod. This is highly objectionable.

SUMMARY OF THE INVENTION

Objects of the Invention

The principal objects of the present invention are: to provide an improved rotary spindle assembly which enables centered and offset machining operations to be performed rapidly and with consistent accuracy without relaxing the engagement of the chuck upon the rod; to provide such an improved spindle assembly in a form, which is simple to make and easy to assemble and operate, which is sturdy in construction and which can be easily and quickly adjusted from one centrally aligned position to an offset position without interfering with the normal rotation of the assembly; and to provide an improved drive for the chuck.

STATEMENT OF THE INVENTION

All of the foregoing objects of my invention are achieved in a rotary spindle assembly comprising: (A) a pair of outer and inner rotary parts, each having a pair of equally spaced long parallel axes, one a center axis and the other an offset axis, (1) the inner part additionally having (a) an offset bore centered on its offset axis and (b) a chuck for centering, on its offset bore axis, a stock-rod passing therethrough, said bore and chuck axes of the inner part and the long axis of a chuck-held stock-rod all coinciding, and (2) said outer part being mountable in an automatic screw machine for rotation about its long center axis (a) said center axis coinciding with the machine axis; (B) means mounting the inner part on the outer part for movement therewith about the center axis of the outer part and for angular adjustment relative thereto about the offset axis of the outer part; (C) means for angularly turning the inner part about the offset axis of the outer part so as to swing said chuck along a curved orbital path, which intersects the center axis of the outer part; and (D) drive means for rotating both parts as a unit about the center axis of the outer part.

With this arrangement, the inner part can be adjusted to one position, in which it centers a stock-rod upon the center axis of the outer part and then both parts, as a unit, can be rotated about that center axis so that "concentric" machining operations can be performed on the end face of the rod and on the adjacent peripheral surface thereof while the rod is rotated with its center axis in the center axis of the outer part. At the end of that operation, the inner part may be angularly turned within and relative to the outer part to another position, in which it places an offset long axis of the rod in coincidence with the center axis of the outer part and both parts again rotated as a unit so that "offset" machining operations can be performed on the end face of the rod and the adjacent peripheral surface thereof while the rod is rotated with its offset long axis in coincidence with the center axis of the outer part. Furthermore, this adjustment can be effected without relaxing the grip of the chuck on the rod and without stopping or even slowing down the rotation of the machine.

BRIEF DESCRIPTION OF THE DRAWINGS

FIGS. 9 and 10 are vertical sectional views taken longitudinally through the inner part to show the contour of its upper and lower wall thicknesses as they appear in FIG. 6, these views showing one of the two left end portions of the inner part in dotted lines;

FIG. 11 is a transverse section taken vertically through the outer part of the assembly as it appears in FIG. 8 with its bore offset upwardly;

FIG. 12 corresponds to FIG. 11 but shows both inner and outer parts as they appear in FIG. 6 where the bore of the inner part is offset downwardly;

FIG. 13 is an enlarged fragmentary view similar to FIG. 12 but showing the inner part turned about 30° toward its FIG. 5 position; and FIG. 14 is a fragmentary developed plan view of the slot an pin connection existing between the inner part and the band, this view showing that connection in solid lines as it appears in FIG. 5 and in dotted lines as it appears in FIG. 6.

DESCRIPTION OF THE PREFERRED EMBODIMENT

Conventional Structure

Figure 1:
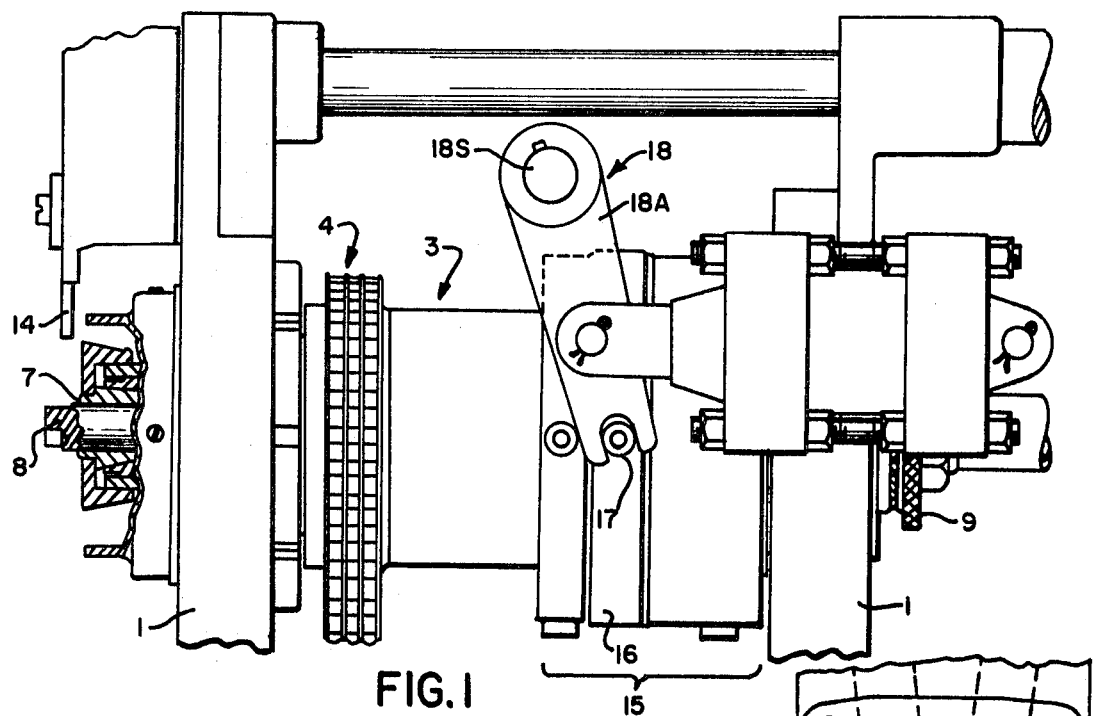
FIG. 1 is a back side elevational view of a rotary assembly of the hollow spindle type constructed in accordance with my invention.
Figure 2:
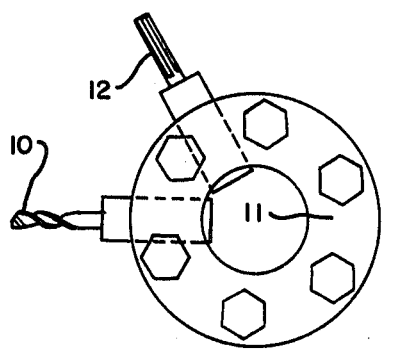
FIG. 2 is a front side elevation showing a turret holding a drill in its operative position.
Figure 4:
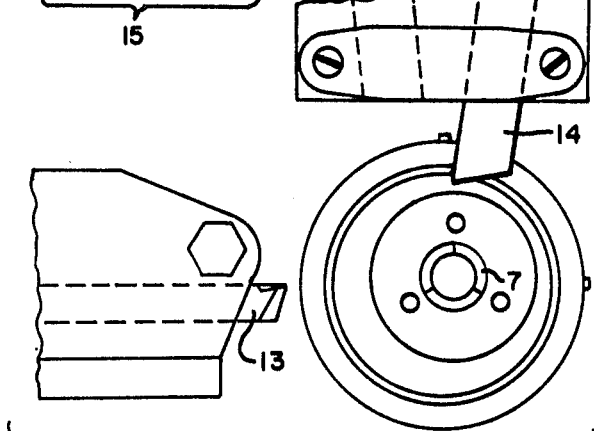
FIG. 4 is an elevational view of the left end of the assembly shown in FIG. 1, this view omitting all of the rotary assembly beyond the extreme left end shown in FIG. 1.
Figure 3:
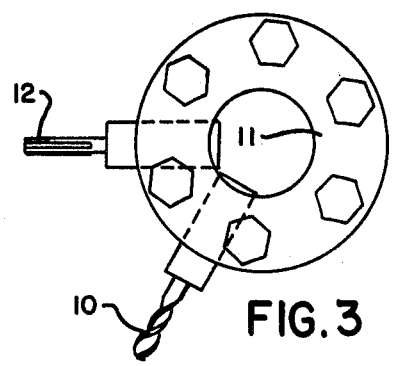
FIG. 3 is a front side view of the same turret holding a reamer in its operative position.
Figure 5:
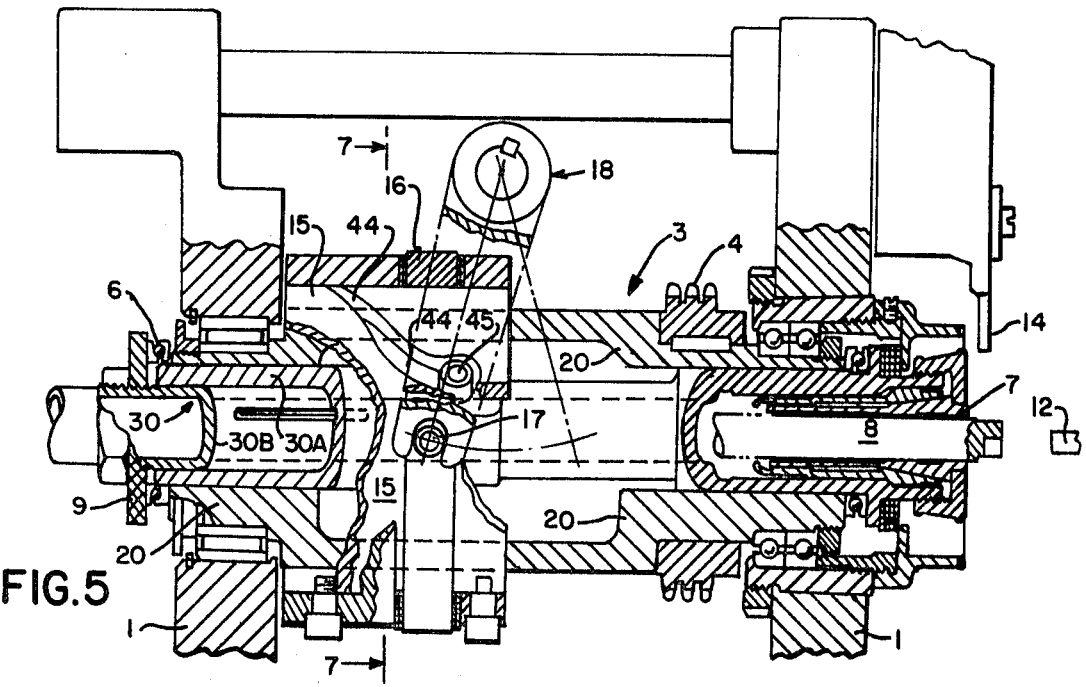
FIGS. 5 and 6 are views, partly in front elevation but mainly in vertical section with the inner part of the assembly positioned, in FIG. 5, to place its bore axis out of coincidence with the center axis of the outer part, and, in FIG. 6, to place its bore axis in coincidence with the center axis of the outer part.
Figure 6:
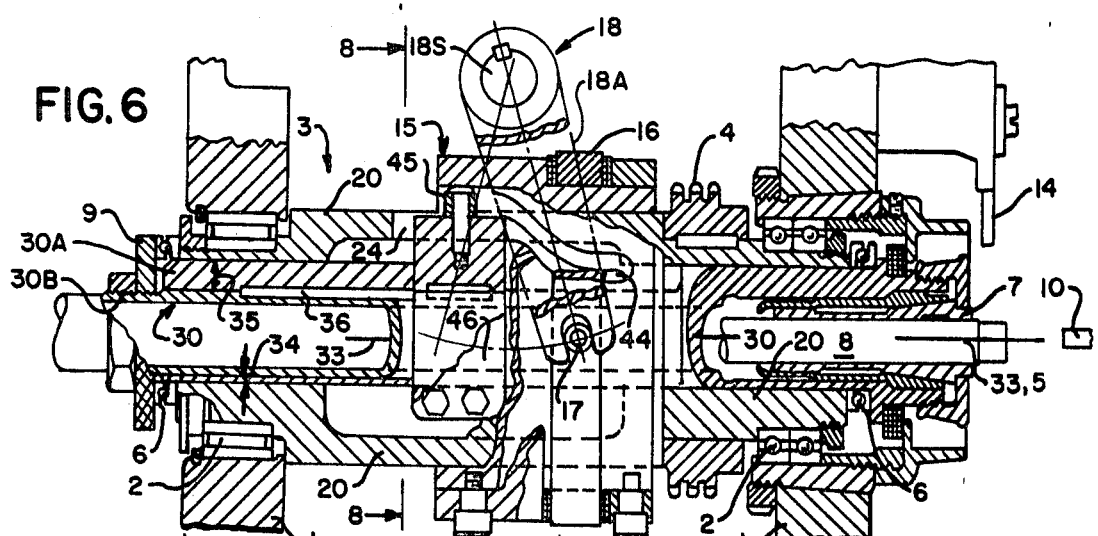

The construction shown in the drawing is conventional to the extent that it includes: a frame 1; a pair of right and left bearings 2, the right bearing (at the right of FIGS. 5 and 6) being anchored while the left bearing floats to permit some axial movement; a rotary spindle structure 3, which is mounted on bearings 2 and rotated by sprocket 4 about the fixed rotary axis 5 of the machine; a pair of thrust bearings 6, one adjacent each end of the rotary structure 3; a chuck 7 carrying a stock-rod 8 and centering the projecting right end portion of that rod on the fixed rotary axis 5 of the machine; a thrust adjusting nut 9; a drill 10; a turret 11 which, in its FIG. 2 position, normally holds the long center axis of the drill in coincidence with the rotary axis 5 of the machine and which, in its FIG. 3 position, similarly holds a reamer 12; side tools 13 and 14 for machining the peripheral surface of the stock-rod 8; an axially slidable band 15 encircling the rotary spindle structure 3 and rotating with it, this band being slidable axially over the periphery of the rotary structure 3 from the extreme left position shown in FIG. 5 to the extreme right position shown in FIG. 6; a nonrotating ring 16 encircling the band 15 and mounted within a peripheral groove on the band 15 to move axially (but not rotationally) with it; a pair of diametrically opposite pins 17 fixedly mounted on the ring to project radially outward therefrom; and a pivotally mounted downwardly open fork 18 straddling the band 15 with the lower ends of its arms slotted to receive the pins 17, which prevent rotation of the nonrotating ring 16. When the fork 18 is oscillated back and forth between its FIG. 5 and FIG. 6 positions, it will move the nonrotating ring 16 axially back and forth and correspondingly move the rotating band 15.

Conventional Operation

The well known 000 automatic screw machine made in the United States by Brown & Sharp Manufacturing Co., Precision Park, N. Kingston, R.I. includes the foregoing conventional structure. As the operation of this machine is well known, it should suffice to say that the foregoing conventional structure, in combination with other well-known conventional parts and controls, which are not shown, functions: to center an elongate rod of stock within the hollow structure and rotate it as desired, usually more or less continuously; to feed that rod through the spindle at intermittent intervals and to the extent required to press that stock against a stop which is appropriately positioned by the turret 11; to operate the turret so as to present one or more tools, such as a drill, reamer, deburrer, etc., to the rod at successive intervals during which the rod and the tools are moved in relation to each other as required to institute, perform and ultimately terminate each operation; and, at one or more contemporaneous or subsequent intervals, to operate one or more of the side tools 13 and 14 to perform turning, threading and like operations on the periphery of the stock-rod 8 and ultimately perform a severing operation which cuts off the machined product end portion of the stock-rod. Normally a transfer tool (not shown) is arranged to remove the severed product and drop it in a bin.

Heretofore, the axial reciprocating motion, imparted to the parts 15—17 by the fork 18, has been conventionally employed for shifting from one operational speed range to another under the control of the means conventionally employed for controlling the time phase relationship of the various operations. In the present case, such motion is used under conventional controls to assist in carrying out the present invention.

Inventive Structure

In accordance with the present invention, the rotary spindle structure 3 is constructed to comprise: an outer part; inner part; means mounting the inner part on the outer part; and means for angularly moving the inner part, and drive means for both parts.

Outer Part

The outer part is in the form of an elongate metal cylinder 20 having a large midportion and reduced end portions geometrically centered on long center axis 21. Each end portion contains an offset bore 22 centered on a long center axis 23, which is spaced or offset a predetermined distance from the axis 21, the bore 22 being large enough to embrace both axes. The rotary outer part 20, which contains a slot 24 in its midportion, is rotationally mounted on frame 1 through the right and left bearings 2 and carries the drive sprocket 4 on its periphery. When mounted, its fixed axis 21 coincides with the fixed rotary axis 5 of the machine.

Figures 7, 8:
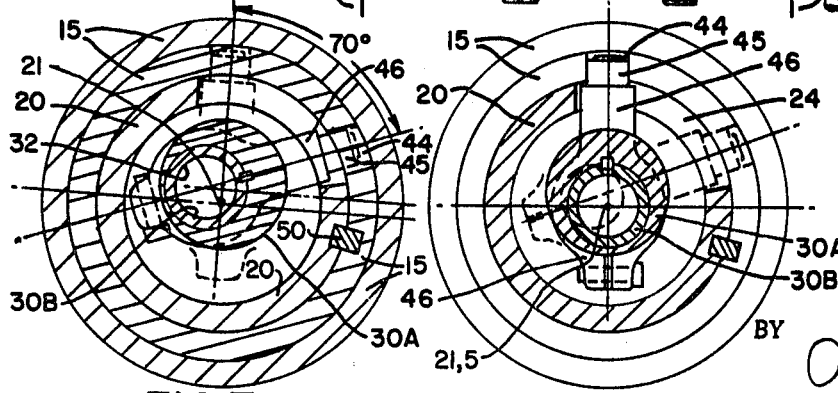
FIGS. 7 and 8 are sectional views respectively taken along lines 7–7 of FIG. 5 and 8–8 of FIG. 6.

In FIGS. 6 and 8, the rotary outer part is shown in a position such that its center axis 21 and its offset bore axis 23 are in a vertical plane, as can be seen in FIGS. 11—12. The outer part 20 as a whole is concentric to axis 21 while its offset bore 22 is concentric to its bore axis 23.

When the outer part is mounted on the machine, their respective center axes 21 and 5 will coincide at all times.

Inner Part

The inner part 30 is in the form of an elongate hollow tubular structure having a geometrically centered long axis 31 an an offset bore 32 centered on a long axis 33, which is spaced from axis 31 by a distance equal to the spacing between the corresponding geometrically centered and offset bore axes 21, 23 of the outer part. As seen in FIGS. 5—6 and 9—10, the elongate hollow tubular structure 30 has right and left end portions separated by a midportion which has an axial length slightly greater than the axial length of the band 15.

The left end portion of the inner part is made in two tubular sections comprising: a larger section 30A which has its outer periphery centered on axis 31, its offset bore centered on offset axis 33 and its wall thickness varying (as seen in FIGS. 6, 8—12) from a minimum 34 at one point to a maximum 35 at a diametrically opposite point; and a smaller uniformly thick section 30B, which has a concentric outer periphery and internal bore but which, when assembled into a snug fit within the bore of a larger tubular section 30A, has its circular bore axis in coincidence with the offset bore axis 33 of 30A. The larger tubular section 30A and the reduced or smaller tubular section 30B in the left end portion of the inner part 30, are keyed together by axial key 36.

The midportion and right end portion of the inner part 30 are formed by, what may be viewed as, an integral extension of the reduced left end section 30B. This extension of left end section 30B is increased in diameter, at least three times, viz: first, at the juncture of the left end portion with the midportion of inner part 30, to provide an annular shoulder 37 which abuts the adjacent right end of outer section 30A; second, at about one-third of its axial length (from the left end portion), to provide another annular shoulder 38 and a circular peripheral seat 39 between annular shoulders 37 and 38; and third, at the beginning of the right end portion, which has (a) a circular periphery, (b) a wall thickness which varies (in FIGS. 6, 8—12) from a minimum at one point to a maximum at a diametrically opposite point, and (c) an offset circular bore which is concentric to the offset bore axis 33 but of a diameter large enough to house the chuck 7.

The conventional chuck 7 is, in accordance with the present invention, mounted within the right end portion of the inner part 30 and concentrically centered upon its bore axis 33; hence, the chuck axis always coincides with the offset bore axis 33 of the bore 32.

Mounting Means

The inner part 30 is mounted on the outer part 20 for rotational movement therewith about one axis, namely the center axis 21 of the outer part, and for angular turning adjustment (relative to the outer part) about another axis, namely the offset bore axis 23 of the outer part. To this end, the inner part 30 is arranged within the offset bore of the outer part with the outer peripheral surfaces of the left and right end portions of the inner part 30 dimensioned to fit snugly and rotationally within the offset bore 22 of the outer part 20.

The inner part 30 is angularly turnable, for adjustment purposes, from the centered position shown in FIGS. 6, 8 and 12 to offset positions, such as the one shown in FIGS. 5, 7 and 13. I.. the centered position of FIGS. 6, 8 and 12, the geometrically centered axis 31 of the inner part coincides with the offset bore axis 23 of the outer part. In the offset position, the geometrically centered axis 31 of the inner part remains centered on the offset bore axis 23 of the outer part, as it does at all other times in all other positions.

However, in moving from its centered position in FIG. 12 to its offset position in FIG. 13, the offset axis 33 of the inner part moves out of coincidence with axis 21 and travels along a circular adjustment arc 40 which extends concentrically about axes 23 and 31. This correspondingly offsets (from axis 21) the common axes of the chuck 7, the chuck-held stock-rod 8 and the bore 32 of the inner part. As a consequence, an offset long axis 41 of the stock-rod 8 now coincides with the center axis 21 (and fixed rotary axis 5) so that the coincident axes of the stock-rod 8, the chuck 7 and offset bore 32 all orbit around the coincident axes 5, 21 and 41 along a circular path having a radius equal to the offset of axis 33 from the fixed rotary axis 21.

Angular Moving Means

While the angular movement of the inner part 30 relative to the outer part 20 may be effected in any of a variety of ways, it can be conveniently effected easily, quickly and simply by (1) providing, between the inner and outer parts, an oblique slot and pin connection—of a character such that, when the pin traverses the axial length of the slot, first in one axial direction and then in the other, it will effect relative angular turning movement, between the parts, first one way and then the other—and (2) connecting the slot and pin connection to the fork 18 to effect the slot traversing movement of the pin.

Accordingly, a slot 44 is obliquely formed in the bore wall of band 15 while a pin 45 is rigidly mounted on the midportion of the inner part 30 to project radially into the slot through an angularly extending wall opening 24 in the outer part.

The axial and rotational components of the oblique slot 44 are such as to provide an angular turning movement of desired magnitude within the limits of the axial movement provided by the fork 18. In other words, when the fork 18 moves from one extreme position, shown in FIG. 5 to its other extreme position, shown in FIG. 6, both parts tend to turn in opposite directions as indicated by FIGS. 7—8.

If we view the outer part 20 as remaining stationary, the inner part 30, in one case, will turn from its upright position in FIG. 8 to its rightwardly inclined position in FIG. 7. In the preferred arrangement shown, the connection of drive sprocket 4 will prevent any turning of the outer part relative to the inner part; hence only the inner part 30 will move relative to the outer part 20 during an adjustment of the angular relationship therebetween.

The pin 45 within slot 44 is rigidly mounted on the inner part 30 through a split ring clamp 46 which encircles (and is clamped rigidly to) seat 39 on the midportion of the inner part 30 and, more particularly, on the seat-providing extension of the reduced section 30B.

It will be understood, of course, that the fork 18 will be moved, first in one direction and then in the opposite direction, at time intervals suitably determined and controlled by the means conventionally provided for controlling the time phase relationship of the various operations of the screw machine as a whole. Such controls are not illustrated since they are conventional and do not form any part of the present invention. It will also be understood that the present invention may be employed for operations offset from either or both sides of the center axis of the stock-rod 8.

Drive Means

An important feature of the present invention resides in the drive means for rotating both parts as a unit. As noted previously, the outer part 20 is conventionally rotated through sprocket 4. In accordance with the present invention, the inner part 30 is driven by connecting the outer sprocket-driven part 20 to the slidable band 15 through an axial key 50 whereby the slot-and-pin connection 44, 45 between band 15 and the split ring clamp 46, which is fixed on inner part 30B, becomes effective to rotate the inner part 30 from the rotation of the band 15 in all axial positions of the band and in all adjusted positions of the inner part.

As a consequence, when sprocket 4 rotates outer part 20, the band 15 will rotate therewith because it is connected thereto through axial key 50 while the inner part 30 will rotate therewith because it is connected through the split ring clamp 46 and pin 45 to the walls of the slot 44 in the rotating band 15. In other words, the foregoing drive connection compels drive sprocket 4 to rotate the outer part 20, band 15, slot-and-pin connection 44, 45, clamp 46 and inner part 30 as a single integrated unit while leaving the band 15 free for axial movement relative to that unit and leaving the inner part 30 free for angular adjustment relative to the outer part 20.

Operation

Since the conventional operation of the machine is clear from the foregoing, it should suffice to say that the machine operates in the conventional automatically controlled way to institute, perform and terminate, simultaneously or successively, all of its prearranged operations such as: (1) end face machining operations in the fixed rotary axis 5 of the machine, which, as stated, coincides with the center axis 21 of the outer part and the offset axis 33 of the inner part; and (2) peripheral surface machining operations concentric to said coincident axes 5, 21 and 33. During such conventional operations, the controls of the machine function to hold the fork 18 in the position shown in FIG. 6.

When a machining operation is to be performed on or concentric to an offset axis, the controls of the machine are prearranged to swing the fork 18 at the appropriate time from its FIG. 6 position toward its FIG. 5 position. This movement of the fork 18 moves the nonrotating ring 16 and the rotating band 15 axially causing the walls of slot 44 in the band to engage the pin 45 and turn it angularly relative to the outer part 20 and within the peripheral opening 24 of part 20. This relative angular movement of pin 45, which effects a corresponding turning movement of clamp 46 and inner part 30, relative to the outer part 20, is centered upon the offset axis 23 of the outer part and the coincident center axis 31 of the inner part. As a consequence, the inner part swings its offset bore axis 33 out of coincidence with axes 5 and 21. This causes bore axis 33 to travel along adjustment arc 40 until a desired point in adjustment arc 40 reaches its position of coincidence with axes 5, 21. When this occurs, a desired offset axis of rod 8, such as offset axis 41, will coincide with axes 5, 21. The controls now stop and hold the fork 18 in the corresponding position.

While the fork 18 is in this corresponding position, the end face of the stock rod may be subjected to drilling, reaming, deburring and like operations which are centered on coincident axes 5, 21 and 41 but which are offset from the center axes of the rod, the chuck and bore 32. Likewise the peripheral surface of the rod may be subjected to turning, threading and like operations which are also centered on coincident axes 5, 21 and 41 but correspondingly offset from the center axes of the rod, chuck and bore 32.

Having described my invention, I claim:

1. An improved elongate hollow rotary spindle assembly for use in hollow spindle machines of the type wherein the machine rotates a rod of elongate stock, which passes through and projects from one end of the machine's hollow spindle assembly while a chuck on that assembly holds that rod centered upon a fixed rotary axis of the machine so that one or more machining operations may be simultaneously performed on the surface of the projecting end portion of the rod, such as the end face thereof or the adjacent portion of its periphery, or both, said spindle assembly comprising:

A. a pair of outer and inner rotary parts, each having a pair of equally spaced long parallel axes, one a center axis and the other an offset axis,
1. the inner part additionally having
a. an offset bore,
b. its offset axis centered in said bore, and c. a chuck for centering, on said offset bore axis, a stock-rod passing therethrough, said bore axis and chuck axis of the inner part coinciding with the long axis of a chuck-held stock-rod, and 2. said outer part being mountable in a spindle machine of said type for rotation about said fixed rotary axis of the machine with its long center axis in coincidence therewith;

B. means mounting the inner part on the outer part for rotational movement therewith about the center axis of the outer part and for angular turning movement relative thereto about the offset axis of the outer part; and C. means for angularly turning the inner part about the offset axis of the outer part so as to move said chuck axis along a curved orbital path, which intersects the center axis of the outer part, said means including 1. a first connection member mounted to one part for rotational movement therewith and for axial movement relative thereto, and
2. a second connection member
   a. mounted to the other part for rotational movement therewith and
   b. connected to said first connection member for effecting relative angular turning movement between said parts upon relative axial movement between said connection members.

2. The assembly of claim 1 wherein:
A. the inner part is in the form of an elongate hollow tubular member having its long center axis geometrically centered and spaced from the offset axis of its bore.

3. The assembly of claim 1 wherein:
A. the outer part is in the form of an elongate hollow tubular member having its long center axis geometrically centered and spaced from its offset axis.

4. The assembly of claim 3 wherein:
A. the inner part is in the form of an elongate hollow tubular member having its long center axis geometrically centered and spaced from the offset axis of its bore;

B. the outer part has an offset bore, its offset axis centered in said offset bore and its long center axis geometrically centered and spaced from its offset bore axis; and C. said mounting means mounts the inner part in the offset bore of the outer part.

5. The assembly of claim 1 wherein:
A. said first connection member is in the form of a band slidably mounted on the outer part for limited back and forth axial movement thereon.

6. The assembly of claim 5 wherein:
A. said axially slidable band contains an oblique slot having both axial and rotational direction components; and B. said second connection member comprises a pin mounted on the inner part for angular turning and rotational movement therewith,
1. said pin projecting radially from said inner part into said band slot.

7. The assembly of claim 6 in combination with:
A. means for moving said first connection member axially back and forth.

8. The assembly of claim 1 wherein:
A. said first connection member is in the form of a band
1. slidably mounted on the outer part for limited back and forth axial movement thereon, and
2. axially keyed to the outer part for rotational movement therewith as a unit; and B. said second connection member comprises means interconnecting said band with the inner part,
1. said means being operative,
   a. upon rotation of said band, to rotate the inner part fixedly with the unit provided by said band and outer part, and
   b. upon axial movement of said band, to turn the inner part relative to said unit and angularly about the offset axis of the outer part.